United States Patent [19]

Lejeune

[11] 3,949,800
[45] Apr. 13, 1976

[54] TIRE WITH PACKAGE BEAD RING
[75] Inventor: Daniel Lejeune, Clermont-Ferrand, France
[73] Assignee: Compagnie Generale des Establissements Michelin, Clermont-Ferrand, France
[22] Filed: Mar. 1, 1974
[21] Appl. No.: 447,365

[30] Foreign Application Priority Data
Mar. 7, 1973  France .............................. 73.08228

[52] U.S. Cl. ............... 152/362 R; 156/136; 245/1.5
[51] Int. Cl.² ......................................... B60C 15/04
[58] Field of Search .................. 152/362 R; 245/1.5; 156/136

[56] References Cited
UNITED STATES PATENTS

| | | | |
|---|---|---|---|
| 1,503,883 | 8/1924 | Cobb .................................... | 245/1.5 |
| 1,503,985 | 8/1924 | Corson.................................. | 245/1.5 |
| 2,149,079 | 2/1939 | White et al. ......................... | 245/1.5 |
| 2,752,980 | 7/1956 | Riggs................................. | 152/362 R |
| 2,904,095 | 9/1959 | Engstrom ....................... | 152/362 R |
| 2,987,095 | 6/1961 | Toulmin, Jr..................... | 152/362 R |
| 2,992,671 | 7/1961 | Bracht.............................. | 152/362 R |
| 3,142,327 | 7/1964 | Herzegh .......................... | 152/362 R |
| 3,548,912 | 12/1970 | Rye et al......................... | 152/362 R |

Primary Examiner—Drayton E. Hoffman
Attorney, Agent, or Firm—Brumbaugh, Graves, Donohue & Raymond

[57] ABSTRACT

A pneumatic tire comprises a bead, a package bead ring in the bead, and a carcass reinforcement turned around the bead ring. The bead ring comprises at least one wire having a cross section of a quadrilateral with two parallel opposite faces. The wire or wires form multiple turns around the tire through the bead that are contiguous in directions extending both radially and axially of the tire.

3 Claims, 7 Drawing Figures

TIRE WITH PACKAGE BEAD RING

BACKGROUND OF THE INVENTION

This invention relates to tires and, more particularly, to pneumatic tires provided with novel and highly-effective beads and bead rings.

A pneumatic tire for automotive vehicles generally comprises a crown that comes into contact with the ground and, on either side of the crown, a sidewall the inner edge of which, intended to be supported by the rim of a wheel, is formed by the bead. The bead has among its components at least one bead ring. The latter fulfills various functions. It serves in particular as anchorage for the ply or plies forming the carcass of the tire and withstands the forces exerted on it by the carcass under the effect of the inflation pressure and the deformations resulting from the travel of the tire. The bead ring also serves to ensure the transmission of longitudinal forces and, in the case of tubeless tires, to ensure a seal between the tire and the wheel rim.

Essentially two types of bead rings are used in the manufacture of pneumatic tires: cabled rings and package rings.

The customary cabled rings have a substantially circular cross section. They are produced by means of a continuous wire of circular section or a continuous strand formed of wires of circular section. The wire or the strand is wound helically around a core until the desired cross section is reached. This type of ring is known for its flexibility and its resistance to tearing, by virtue of its cabled structure itself.

Package rings can be made from a continuous wire of circular section, the wire being wound on a suitable support so as to form several superimposed layers of adjoining parallel turns. Alternatively, a package ring can be formed from a ply of adjoining, parallel continuous wires which is wound in such a manner as to constitute several superimposed layers.

The cross section of the package rings may be any desired. In general, this section is adapted as nearly as possible to the architecture and shape of the beads in which the rings are to be arranged.

Despite their simple and economic manufacture, package rings have two defects. The first appears as soon as the tire is introduced into the mold in order to be molded and vulcanized, namely the wires move with respect to each other in the cross section of the bead ring. The result is differences in tension which give rise to the second defect, namely the relatively low resistance to rupture as compared with the cross section of material used.

The instability of shape in cross section of package rings has not been improved by surrounding them at regular intervals with collars which clamp them. This measure does not prevent disorder of the wires between two consecutive collars.

It has also been attempted to replace the layers of wire by a strip of the same cross section, as described in French Pat. No. 1,281,439. With this latter means one can obtain rings of square, rectangular or possibly parallelogram section only. However, these sections also poorly withstand the stresses due to the molding of the bead. The strips slide on each other, since it is difficult to obtain a strip that is perfectly plane on its two major faces at a cost permitting the inclusion thereof in articles in mass production, such as tires. Moreover, it is difficult to obtain from a strip a bead ring having its radially inner wall conical; that is, inclined to the common axis of the tire and ring, as is at times necessary in the case of tubeless tires with bead seats which are themselves conical.

SUMMARY OF THE INVENTION

An object of the invention is to provide a pneumatic tire whose beads are provided with bead rings of the package type characterized by improved stability of shape.

This object and others are attained in accordance with the invention by providing a tire having beads provided with package rings around which the carcass reinforcement ply or plies are wound, the beads possibly comprising an insert of stuffing rubber, and the rings possibly having a sheathing or covering or rubber. The tire is characterized in that each bead comprises at least one package ring of one or more wires having a quadrilateral section with at least two parallel opposite sides, the adjoining turns of wires touching each other both in the radial direction and in the axial direction along their facing surfaces.

The category of quadrilaterals having at least two parallel opposite sides comprises rectangles, squares, diamonds, parallelograms, trapezoids and isosceles trapezoids.

Preferred embodiments of the invention can also be characterized by the following features, these being examples only and not limiting:

a. The cross section of the wire may be rectangular, the contact in the radial direction between two neighboring wires taking place via the large sides of the rectangles. Such a wire is easy to manufacture, and its cross section lends itself well to the making of bead rings in the shapes customarily employed.

b. The edges of the wire of quadrilateral section may be slightly blunted or rounded, without this resulting, however, in substantial empty spaces in the overall cross section of the bead ring. The presence of sharp edges, without burrs, improves the contact between wires and makes the bead ring uniform.

c. The wire of rectangular cross section can, within the cross section of the ring, have its large sides inclined with respect to the common axis of the tire and bead ring. This makes it possible to produce package rings of parallelogram cross section. However, one can also use a single wire of parallelogram cross section adapted to the cross section and to the orientation of the cross section of the ring, for instance with respect to the seat of the bead on the rim or with respect to the axis of the tire.

d. The unit wire used may be of any simple or composite material capable of being transformed in any manner into a wire with a cross section in accordance with the invention. The selection will preferably be made from inexpensive materials such as metal, plastic, or synthetic materials and glass.

e. The bead of the tire may have one or more bead rings in accordance with the invention, possibly in combination with other types of bead rings.

The superiority of the package rings in accordance with the invention is based essentially on the selection of the special cross section of the unit wire employed. This cross section makes it possible to optimize and make uniform the contact and transmission of forces between adjacent wires, as compared with the customary wires of circular cross section which can touch other only along relatively small surface lines.

As a result of the invention, there are obtained bead rings not only of smaller cross sections, since they have practically no empty spaces, but also of stabilized cross sections. This stabilizing has a beneficial effect on the arrangement of the components of the beads, which becomes more in accordance with the theoretical arrangement. This narrowing of tolerances increases the resistance to wear and tear of the beads and may in certain cases result in a bead life more than twice that obtained with conventional package rings.

The bead rings in accordance with the invention also show a resistance to rupture which may be 25% greater than that of package rings of the same useful cross section.

The process of manufacturing the tires is facilitated by the use of bead rings in accordance with the invention, because such rings are in no way wavy. Stated differently, they have a circular neutral fiber which is contained within a plane. This facilitates the placing of the components.

BRIEF DESCRIPTION OF THE DRAWING

A better understanding of the invention can be gained from a consideration of the following detailed description of the preferred embodiments thereof in conjunction with the appended figures of the drawing, wherein.

DESCRIPTION OF THE PREFERRED EMBODIMENTS

Figure 1:
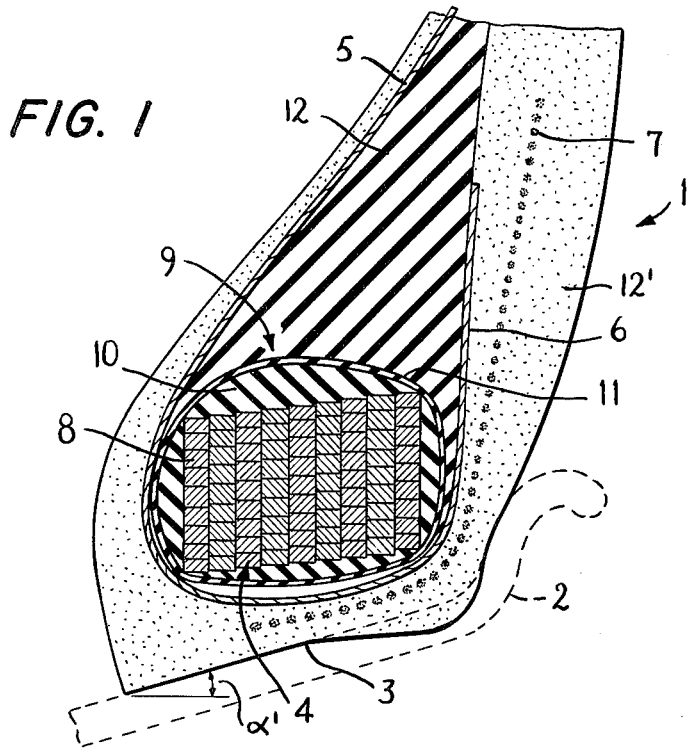
FIG. 1 shows a tire bead provided with a package bead ring in accordance with the invention.

FIG. 1 shows a tire bead 1 of size 11.00-20 of the tubeless type. The bead rests on a rim having a side portion 2. The bead seat 3 is inclined by an acute angle $\alpha_1$ of 15° with respect to the axis (not shown in FIG. 1) of the tire. Around the bead ring 4 there is turned a cracass reinforcement ply 5 comprising radially arranged cords. Along the folded-back portion 6 of the carcass ply 5 there is arranged a stiffening ply 7 the cords of which are inclined with respect to the radial direction.

The bead ring 4 comprises unit wires 8 or rectangular section wound adjacent to each other in multiple turns around the tire through the bead so as to form a parallelogram cross section the base of which is substantially parallel to the bead seat 3. The multiple turns of the wires 8 are contiguous in directions extending both radially and axially of the tire. The bead ring 4 is preferably surrounded by a covering 9. The covering 9 comprises an insert of stuffing rubber 10 in contact with the bead ring 4 and a rubber sheathing 11 which clamps the stuffing 10. Radially on the outside of the ring 4, the bead has an insert of apex rubber 12. The apex rubber 12 is of a quality different from that of the rubber in other portions of the bead, as indicated for example at 12', and is preferably not as hard as the stuffing rubber 10 of the ring 4, the latter being in turn less hard than the rubber of the sheathing 11.

Figure 2:
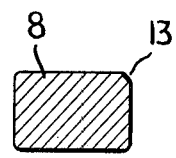
FIG. 2 shows on a larger scale the cross section of the wire used to make the bead ring according to FIG. 1.

FIG. 2 is enlarged view showing the cross section of the wire 8 with blunted or rounded edges 13.

By way of example, the ring 4 comprises $9 \times 9 = 81$ wires 8 of steel, of rectangular cross section, the base of which measures 2 mm and the height 1.3 mm. Its resistance to rupture is 22% greater than that of an ordinary package ring having the same useful cross section, but formed of wire of circular section wound so as to form also a circular section.

Figure 3:
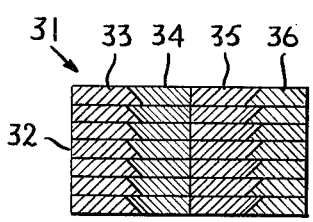
FIG. 3 to 6 show examples of cross sections of bead rings in accordance with the invention made with different cross sections of wire.
Figure 4:
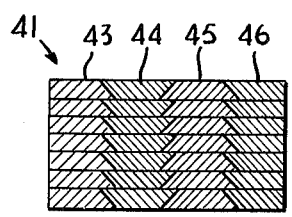

FIGS. 3 and 4 show cross sections of rectangular bead rings obtained with wire of trapezoidal cross section (FIG. 3) and with wire of trapezoidal cross section and wire having the cross section of an isosceles trapezoid (FIG. 4).

Figure 5:
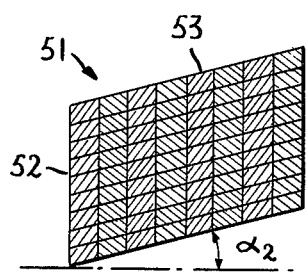

FIG. 5 shows another ring cross section inclined at an acute angle $\alpha_2$ with respect to the axis (not shown) of the bead ring obtained by means of a wire of parallelogram cross section.

In order to make the package ring of cross section 31 corresponding to FIG. 3, four adjoining wires 33, 34, 35, 36 are wound in such a manner as to form seven superimposed identical layers 32, the cross sections of the wires 33 and 35 being reversed with respect to those of the wires 34 and 36.

The package ring of cross section 41 corresponding to FIG. 4 is made by winding a ply of adjoining wires 43, 44, 45, 46. The wires 43 and 46 have cross sections in the shape of a rectangular trapezoid reversed with respect to each other. The wires 44 and 45 have cross sections of the shape of an isosceles trapezoid reversed with respect to each other.

The package ring 51 shown in cross section in FIG. 5 is obtained by means of wire 53 of parallelogram cross section. It can be made by spirally winding a single wire 53, but it can also be made by winding a ply 52 of adjoining wires 53.

Figure 6:
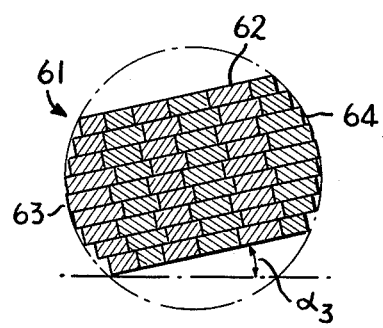

FIG. 6 shows a ring 61 having a cross section which is both inclined by an acute angle $\alpha_3$ with respect to the axis (not shown) of the ring and curved laterally at 63, 64. This cross section is obtained by means of a wire 62 whose cross section varies in accordance with a given law. This makes it possible to obtain an intermeshing of the cross sections like the bricks of a wall, as well as the laterally curved contour.

Figure 7:
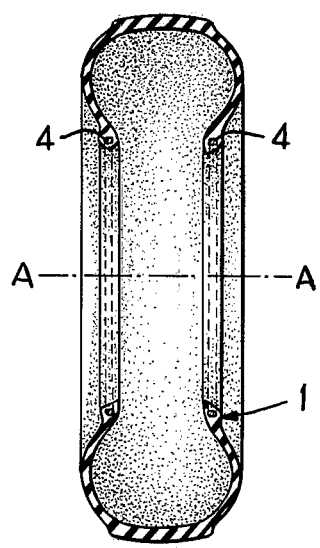
FIG. 7 is a view in radial section on a scale small enough to show both beads of a tire provided with package bead rings in accordance with the invention.

FIG. 7 is included to show the package bead rings in both of the tire beads and the common axis A—A of the package bead rings and the tire.

Many other embodiments of the invention will readily occur to those skilled in the art upon consideration of this disclosure. Accordingly, the invention is not limited except by the appended claims.

I claim:

1. A pneumatic tire comprising a bead, a package bead ring in the bead, and a carcass reinforcement turned around the bead ring, the bead ring comprising at least one metal wire having a cross section of a quadrilateral with two parallel opposite faces, said at least one wire forming adjoining multiple turns around the tire through the bead, said adjoining turns making metal-to-metal contact with each other along their facing surfaces in directions extending both radially and axially of the tire, further comprising a rubber sheathing surrounding the bead ring and a stuffing rubber around the bead ring and contained within the sheathing.

2. A tire according to claim 1 wherein the stuffing rubber is softer than the sheathing rubber.

3. A tire according to claim 1 wherein the bead comprises a first rubber and an apex rubber of a different quality, the apex rubber being outside the sheathing and disposed radially outwardly thereof and the stuffing rubber being harder than the apex rubber.

* * * * *

UNITED STATES PATENT AND TRADEMARK OFFICE
CERTIFICATE OF CORRECTION

PATENT NO. : 3,949,800
DATED : April 13, 1976
INVENTOR(S) : Daniel Lejeune

It is certified that error appears in the above—identified patent and that said Letters Patent are hereby corrected as shown below:

On the Cover Page, after [73] Assignee, "Establissements" should read --Etablissements--; Col. 2, line 16, "or" (second occurrence) should read --of--; Col. 2, line 67, after "touch" should be --each--; Col. 3, line 33, "FIG." should read --FIGS.--; Col. 3, line 52, "or" should read --of--; Col. 4, line 1, after "is" should be --an--.

Signed and Sealed this

Fourteenth Day of September 1976

[SEAL]

Attest:

RUTH C. MASON
Attesting Officer

C. MARSHALL DANN
Commissioner of Patents and Trademarks